Dec. 15, 1931.    R. WEHR    1,836,738
VALVE CONSTRUCTION
Filed Sept. 12, 1930
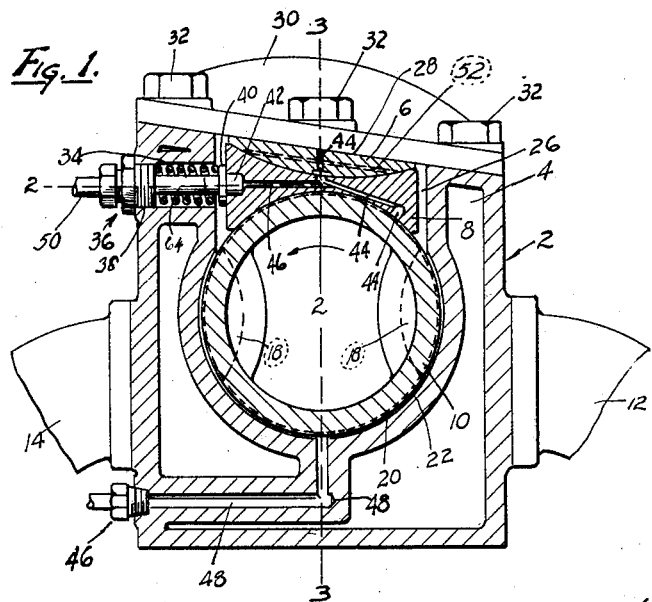
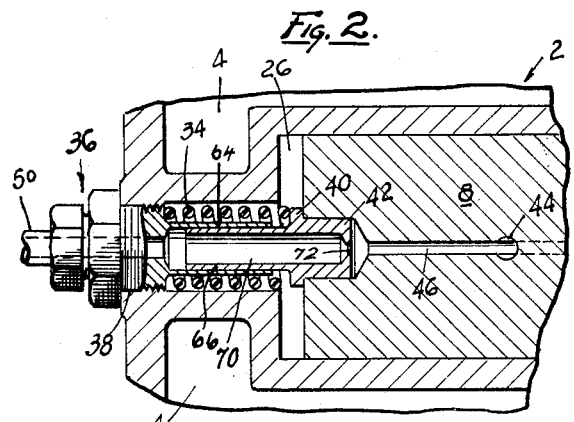
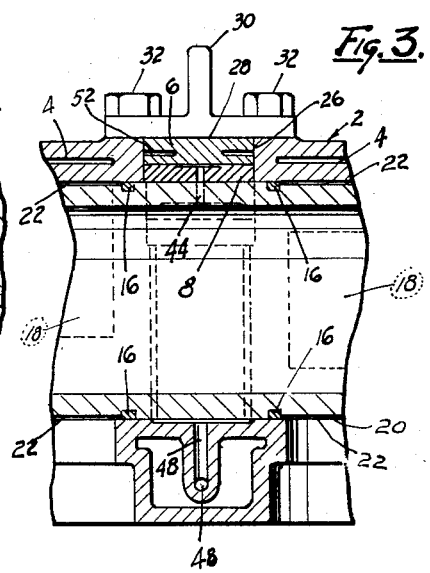
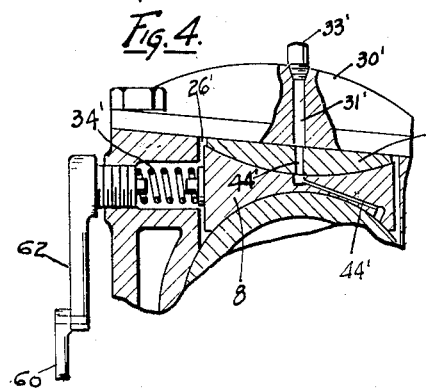
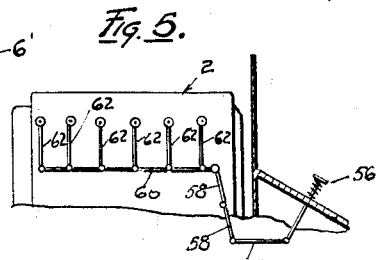
Inventor
RUDOLPH WEHR
By Fred D. Hayn
Attorney Patented Dec. 15, 1931

1,836,738

UNITED STATES PATENT OFFICE

RUDOLPH WEHR, OF LOS ANGELES, CALIFORNIA

VALVE CONSTRUCTION

Application filed September 12, 1930. Serial No. 481,471.

My invention relates to valve constructions, and more particularly those used on internal combustion engines provided with rotary valves having bearing means associated therewith, which bearing means may comprise a temperature and wear compensating means in the form of conventional or other shoes adapted not only for relative movement, but also relative movement with respect to said valve construction, novel means being also provided for urging at will said bearing members, and said valve to its seat.

It accordingly is an object of my invention to provide a novel form of valve construction in which a fluid pressure means, preferably in the form of a lubricant under pressure by any suitable mechanism associated in any desired way with the engine plant, is adapted to apply at will varying pressures to the bearing or packing means associated with the valve of said construction to hold said valve to its seat, said fluid pressure means being manually controlled, for example by the accelerator of the motor vehicle, when said construction is associated therewith, said fluid pressure means being especially useful when the motor of the vehicle is under heavy load, as for example, when climbing a hill.

It is also within the province of my invention to utilize the fluid pressure means for lubricating the valve, which may be accomplished by means of a suitable set of passages in the bearing or packing members or shoes of the valve construction.

The above, and further objects and advantages of my invention, as will hereinafter more fully appear, I attain by the construction disclosed in the specification, and illustrated in its preferred form on the drawings, forming a part of my application.

Reference is had to the accompanying drawings, in which similar reference characters denote similar parts. In the drawings, Fig. 1 is a fragmentary, transverse cross-sectional view through my novel form of valve construction, Fig. 2 is an enlarged cross-sectional view taken on the line 2—2, Fig. 1, Fig. 3 is a fragmentary longitudinal cross-sectional view, taken on the line 3—3, Fig. 1, Fig. 4 is a fragmentary, detail view on an enlarged scale of a modification, illustrating also another way in which the lubricant may be introduced into the valve construction, and Fig. 5 is a similar view showing the manner in which the fluid pressure means may be controlled by the accelerator of a motor vehicle.

Describing my invention more in detail, in its broader aspects said invention comprises a valve construction having a valve of any desired configuration associated therewith, and preferably of the rotary type, which construction is equipped with conventional or other forms of bearing members in the shape of temperature and wear compensating shoes, fluid pressure means, such as a lubricant supply under pressure or mechanical means being utilized to vary at will, and especially at full load, the pressure of said bearing members on said valve to hold said valve to its seat.

More specifically said invention comprises a valve construction having a suitable housing 2 having the usual cooling channels 4, which housing also has a bore 20 in which is positioned the rotary valve 10 of any preferred configuration.

Either the bore 20 or the valve 10 on its periphery may be provided with a clearance space 22 (Fig. 3), said spaces being positioned in those compartments of the valve construction which face the cylinders of the engine, which are not shown, but are opposite the cylinder ports 18 (Fig. 3) the motive fluid entering by means of the pipe 12 and exhausting by means of the pipe 14, the valve 10 having suitable ports to control the inlet and exhaust ports in relation to the cylinder ports 8, said valve travelling in the direction of the arrow shown in Fig. 1.

By this construction the valve 10 never touches its seat in the region of the engine cylinders, and the means for holding the valve to its seat, to prevent leakage, and to compensate for changes in temperature and wear are all removed from the compartments immediately above the cylinder, involving a marked departure from constructions hereinbefore proposed.

Alternating with what may be called the power compartments of the engine, that is those compartments of the valve construction just above the engine cylinders, and where the clearance spaces 20 are positioned, are the bearing compartments 26, in which compartments are positioned the means for holding the valve 10 to its seat.

This means may in practice take any form desired, either novel or conventional, and may comprise a pair of temperature and wear shoes 6 and 8, which are both relatively movable with respect to themselves, and the assembly movable relatively with respect to the inclined inner wall 28 of the cover 30, detachably associated with the valve construction 2 in any desired way, as by the screw bolts 32.

An automatic means is provided for continually urging the shoes 6 and 8 against the periphery of the valve 10, to hold said valve to its seat, which shoes remain unaffected by any power conditions within the compartments in the valve construction above the cylinders. This automatic means may take the form of a spring 34 (Figs. 1 and 2), adjustable as needed by any preferred means, such as the nut assembly 36, said spring abutting at one end against the screw-threaded sleeve 38 and at the other against the flange 40 of the sleeve 42.

The sleeve 42, as seen in Figs. 1 and 2, is adapted to project within a depression in the lower shoe 8, and hence said shoe, together with the upper shoe 6, is continually urged against the periphery of the valve 10, tending to hold said valve to its seat, the upper shoe 6 being relatively movable with respect to the tapered inner wall 28 of the cover 30 (Fig. 1).

If desired, the lubricant for keeping the valve 10 constantly lubricated, may be supplied to the valve construction 2 by the structure depicted in Fig. 4, the cover 30' being provided with a passage 31', to which is connected the lubricant supply pipe 33', leading to the passages 31' and the passages 44' of the shoes 6' and 8' to the periphery of the valve, said shoes being continually urged against the periphery of said valve, precisely as previously described, by the nut and spring assembly 34'. This figure discloses also further modifications, presently to be described.

In all instances, the alternate bearing compartments 26 are subjected to vacuum conditions, the lubricant being maintained under said conditions by the pipe connection 46 (Fig. 1) connected to any convenient source of suction, said connection being in fluid connection with the lubricant passages 48 (Figs. 1 and 3) to this end.

In Figs. 1 and 3 the lubricant is supplied in a different manner than that shown in Fig. 4, being conveyed to the passages 44, and cut-out or cut-away portions between the shoes 6 and 8, above said shoe 6, around the periphery of the valve 10, and out through the passages 48 and connection 46, said lubricant being introduced by means of a pipe 50, which pipe has also other functions, presently to be explained.

As will be seen more particularly in Fig. 3, the bearing chambers 26 are packed from the alternate power chambers by any suitable means, such as the packing rings 16, associated in any preferred manner with the valve 10 and the housing 2, the clearance spaces 22 preferably extending directly to said rings, as shown in said figure. This construction effectively packs the power chambers against leakage to the bearing chambers, irrespective of any temperature changes in said power chambers, all expansion, contraction and wear being compensated for in the alternate bearing chambers by the wedge shoe assembly 6 and 8.

If desired, the upper shoe 6 may be provided with cut-out or cut-away portions 52 to make said shoe more elastic to compensate for any inaccuracies in machining.

During heavy loads, such as when a motor is climbing a hill, and when the motor in any of its possible associations, is subjected to heavy duty, it may be desirable to apply added and varying pressures to the shoes 6 and 8 to force the valve to its seat. In fact, it may in practice be desirable during running conditions of the engine to increase the pressure of the bearing parts in the alternate bearing compartments, that is, the shoes 6 and 8, against the periphery of the valve, to increase the pressure of the valve on its seat.

To this end, the structure shown more particularly in Figs. 2 and 5, is provided.

This may be done by means of the accelerator pedal 56, through suitable link connections 58, and the operating rod 60, simultaneously actuating a suitable lubricant control by means of the operating rods 62. Any means for varying manually the pressure of said fluid on said shoes may be provided.

As shown in Figs. 1 and 2, the threaded sleeve 38, with its elongated bushing extension 64 is slidably fitted over the bushing extension 66 of the sleeve 42. The lubricant under pressure is introduced to the wedge shoe assembly 6 and 8 by means of the pipe 50, passing through the nut assembly 36, entering an oil chamber 70.

Under ordinary or average conditions said oil will pass through the hole 72, which is smaller in diameter than the inlet from the pipe 50, into the passages 46, 44 to lubricate said valve 10.

When the engine is working under heavy load or at a higher speed above the average, the oil supply is greater, and due to this fact, said oil accumulates in the chamber 70, creating an increased pressure, thus forcing the sleeve 42 and the wedge shoe assembly 6 and 8 in the opposite direction of the rotation of said valve 10 and into its seat, preventing lifting of said valve 10 at the bearings. This construction provides for automatic adjustment of the bearings at full load and at high speed. In Fig. 4, the adjustment of the shoes 6' and 8' is made mechanically, instead of automatically, as previously explained.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

I claim as my invention:

1. In an internal combustion engine, a valve, means for holding said valve to its seat, and manual means associated with said last mentioned means for controlling said means at will to hold said valve to its seat during varying load conditions to which said engine is subjected.

2. In a valve construction, a rotary valve, means for holding said valve to its seat, and means associated with said last mentioned means for controlling at will the degree of pressure on said means.

3. In a valve construction, a valve, packing means for holding said valve to its seat, and manual means for adjusting at will said packing means as said valve is operated.

4. In an internal combustion engine, at least one cylinder associated with said engine, a rotary valve controlling said cylinder, means for packing said valve on both sides of said cylinder and manual means for controlling at will the degree of pressure on said last mentioned means.

5. In an internal combustion engine provided with cooling channels, a set of cylinders, a rotary valve controlling said cylinders, bearing members on each side of each of said cylinders, and manual means for controlling at will the degree of pressure on said members during running conditions of said engine.

6. In an internal combustion engine, a set of cylinders, a rotary valve for controlling said cylinders, means for holding said valve to its seat upon each side of each of said cylinders, and fluid pressure means for controlling at will the degree of pressure of said valve on its seat.

7. In an internal combustion engine, a set of cylinders, a rotary valve for controlling said cylinders, temperature and wear compensating means associated with said valve upon each side of each of said cylinders, and manual means for controlling at will said last mentioned means during running conditions of said engine.

8. In a valve construction, a rotary valve, and manually controlled means for varying at will the degree of pressure of said valve on its seat at full load.

9. In a valve construction, a rotary valve, plural means for holding said valve to its seat, and fluid pressure means associated with each of said plural means for controlling at will the pressure of said valve on its seat.

10. In a valve construction, a rotary valve, means for holding said valve to its seat, and a combined manual and automatic means for adjusting said last mentioned means.

11. In a valve construction, a rotary valve, plural means for holding said valve to its seat, automatic means associated with each of said plural means for moving said plural means in a direction contrary to the rotation of said valve and manual means for controlling at will the pressure of said plural means on said valve.

12. In a valve construction, a rotary valve, sets of packing shoes for holding said valve to its seat, spring means for varying said shoes against said valve, and fluid pressure means for increasing at will the pressure of said shoes on said valve.

13. In a motor vehicle, an internal combustion engine, a rotary valve for controlling said engine, plural means for holding said valve to its seat, and means adapted to be actuated by the operator of said vehicle for controlling at will the pressure of said plural means on said valve.

14. In a valve construction, a rotary valve, sets of packing shoes for holding said valve to its seat, said shoes being provided with means whereby said valve may be lubricated, means for holding said shoes against said valve, and fluid pressure means for increasing at will the pressure of said shoes against said valve.

15. In an internal combustion engine, a valve construction comprising a rotary valve for controlling the cylinders of said engine, said construction being provided with bearing chambers on each side of each of said cylinders, bearing members in each of said bearing chambers, means for packing said bearing chambers against leakage from said cylinders, and fluid pressure means for increasing at will the pressure of said bearing members on said valve.

16. In an internal combustion engine, a valve construction comprising a rotary valve for controlling the cylinders of said engine, said construction being provided with a set of chambers spaced along the longitudinal length thereof, the alternate of said chambers being of greater size than the others, means for packing said alternate chambers from the others, means for subjecting said other chambers to vacuum conditions, bearing members in each of said alternate chambers, automatic means for urging said bearing members against said valve, and manual means for controlling at will the pressure of said bearing members on said valve.

17. In a valve construction, a rotary valve, means for holding said valve to its seat, and fluid pressure means for actuating said means at will, said fluid pressure means also functioning to lubricate said valve through said first means.

In testimony whereof I have signed my name to this specification.

RUDOLPH WEHR.